(12) United States Patent
Brenner

(10) Patent No.: US 10,996,345 B2
(45) Date of Patent: May 4, 2021

(54) SIGNAL FAULT DETECTION FOR GLOBAL NAVIGATION SATELLITE SYSTEM USING MULTIPLE ANTENNAS

(71) Applicant: Honeywell International Inc., Morris Plains, NJ (US)

(72) Inventor: Mats Anders Brenner, Plymouth, MN (US)

(73) Assignee: Honeywell International Inc., Charlotte, NC (US)

(*) Notice: Subject to any disclaimer, the term of this patent is extended or adjusted under 35 U.S.C. 154(b) by 193 days.

(21) Appl. No.: 16/005,403

(22) Filed: Jun. 11, 2018

(65) Prior Publication Data

US 2019/0377095 A1 Dec. 12, 2019

(51) Int. Cl.
*G01S 19/55* (2010.01)
*G01S 19/44* (2010.01)
(Continued)

(52) U.S. Cl.
CPC .............. *G01S 19/55* (2013.01); *G01S 19/44* (2013.01); *G01S 19/071* (2019.08); *G01S 19/41* (2013.01); *G01S 19/43* (2013.01); *G08G 5/0052* (2013.01)

(58) Field of Classification Search
CPC .......... G01S 19/55; G01S 19/41; G01S 19/43; G01S 19/44; G01S 19/071; G08G 5/0052
(Continued)

(56) References Cited

U.S. PATENT DOCUMENTS 6,114,988 A * 9/2000 Schipper ................. G01S 19/53
342/357.58
6,639,549 B2 10/2003 Vanderwerf et al.
(Continued)

FOREIGN PATENT DOCUMENTS

CN 105182391 A 12/2015
CN 109683183 A 4/2019
(Continued)

OTHER PUBLICATIONS

Bhatti, Umar Iqbal et al., "Detecting Multiple failures in GPS/INS integrated system: A Novel architecture for Integrity Monitoring", Centre for Transport Studies, Department of Civil and Environmental Engineering, Imperial College London, 2009, p. 1-18, vol. 8, No. 1:26-42, Published: Journal of Global Positioning Systems.
(Continued)

*Primary Examiner* — Chuong P Nguyen
(74) *Attorney, Agent, or Firm* — Fogg & Powers LLC

(57) ABSTRACT

A Global Navigation Satellite System (GNSS) based navigation system with signal fault detection is provided. A least one controller is configured to; determine a true carrier phase measurement associated with each satellite signal received at each antenna of a plurality of spaced antennas; resolve integer ambiguities in true carrier phase measurement differences; and calculate at least one variable of a first navigation solution based on the obtained first set of resolved integer ambiguity measurements. The at least one controller is further configured to apply a solution separation process to repeatedly; calculate the at least one variable of a second navigation solution; determine a difference between the at least one variable of the second navigation solution and the first navigation solution; and detect a fault in satellite signals when the determined difference exceeds a defined threshold.

19 Claims, 3 Drawing Sheets

(51) Int. Cl.
      *G08G 5/00*    (2006.01)
      *G01S 19/43*   (2010.01)
      *G01S 19/07*   (2010.01)
      *G01S 19/41*   (2010.01)

(58) Field of Classification Search
      USPC ............ 342/357.38, 357.27, 357.26, 357.24, 342/357.44
      See application file for complete search history.

(56) References Cited

U.S. PATENT DOCUMENTS

| | | | |
|---|---|---|---|
| 7,219,013 | B1 | 5/2007 | Young et al. |
| 7,292,185 | B2 * | 11/2007 | Whitehead ............... G01S 19/53 342/357.36 |
| 7,555,262 | B2 * | 6/2009 | Brenner ................ G01S 19/071 455/12.1 |
| 8,035,557 | B2 * | 10/2011 | Thomson .............. G01S 19/215 342/357.59 |
| 8,803,736 | B2 | 8/2014 | Dai et al. |
| 8,976,064 | B2 | 3/2015 | Brenner |
| 9,341,718 | B2 | 5/2016 | Vanderwerf |
| 9,507,028 | B1 | 11/2016 | Yoo |
| 9,593,962 | B2 * | 3/2017 | Brenner ............... G07C 5/0808 |
| 9,599,721 | B2 | 3/2017 | Dai et al. |
| 9,645,245 | B2 | 5/2017 | Osipov et al. |
| 9,829,582 | B2 | 11/2017 | Wu et al. |
| 9,880,021 | B2 * | 1/2018 | Brenner ................. G01S 19/54 |
| 9,915,734 | B2 * | 3/2018 | Scheitlin ................ G01S 19/07 |
| 10,054,687 | B2 | 8/2018 | Whitehead |
| 10,114,126 | B2 | 10/2018 | Wu et al. |
| 10,234,564 | B2 | 3/2019 | Whitehead |
| 10,495,761 | B2 * | 12/2019 | Skalicky ................ G01S 19/28 |
| 2004/0058645 | A1 * | 3/2004 | Brenner ................. G01S 19/21 455/11.1 |
| 2015/0048973 | A1 | 2/2015 | Whitehead |
| 2016/0290826 | A1 * | 10/2016 | Brenner ............... G07C 5/0808 |
| 2017/0139052 | A1 | 5/2017 | Skalicky et al. |
| 2017/0192103 | A1 | 7/2017 | Kundak et al. |
| 2019/0212456 | A1 * | 7/2019 | Schipper ................ G01S 19/28 |

FOREIGN PATENT DOCUMENTS

| | | |
|---|---|---|
| CN | 110161546 A | 8/2019 |
| CN | 110221332 A | 9/2019 |
| CN | 110645979 A | 1/2020 |
| WO | 2019203679 A1 | 10/2019 |

OTHER PUBLICATIONS

Hwang, Patrick Y., "Applying NIORAIM to the Solution Separation Method for Inertially-Aided Aircraft Autonomous Integrity Monitoring", Proceedings of the 2005 Natl. Technical Mtg. of the Institute of Navigation, 2005, pp. 992-1000, pp. 1-4, Published: ION Publications, San Diego, CA.

Giorgi et al., "GNSS Carver Phase-Based Attitude Determination", Recent Advances in Aircraft Technology Chapter 9, 2012, pp. 1 through 30, IntechOpen, www.intechopen.com.

Li et al., "A Low-Cost INS-Integratable GNSS Ultra-Short Baseline Attitude Determination System", Sensors 2018, Jul. 1, 2018, pp. 1 through 19, MDPI.

European Patent Office, "Extended European Search Report from EP Application No. 19178562.5", from Foreign Counterpart to U.S. Appl. No. 16/005,403, dated Oct. 25, 2019, pp. 1-10, Published: EP.

Perepetchai, "Global Positioning System Receiver Autonomous Integrity Monitoring", School of Computer Science, Aug. 2000, pp. 1-109, McGill University, Montreal.

Wang et al., "Rover Autonomous Integrity Monitoring of GNSS RTK Positioning Solutions with Multi-Constellations", 22nd International Meeting of the Satellite Division of the Institute of Navigation, Sep. 22-25, 2009, pp. 1361-1370, Savannah, GA.

European Patent Office, "Communication pursuant to Article 94(3) EPC from EP Application No. 19178562.5", from Foreign Counterpart to U.S. Appl. No. 16/005,403, dated Aug. 21, 2020, pp. 1 through 5, Published: EP.

Broshears E et al: "Ultra-Wideband Aided Carrier Phase Ambiguity Resolution in Real-Time Kinematic GPS Relative Positioning", Proceedings of the 26th International Technical Meeting of the ION Satellite Division, Sep. 2013, pp. 1277 through 1284, ION GNSS+.

European Patent Office, "Communication pursuant to Article 94(3) EPC from EP Application No. 19178562.5", from Foreign Counterpart to U.S. Appl. No. 16/005,403, dated Feb. 19, 2021, pp. 1 through 8, Published: EP.

* cited by examiner

SIGNAL FAULT DETECTION FOR GLOBAL NAVIGATION SATELLITE SYSTEM USING MULTIPLE ANTENNAS

BACKGROUND

The determining of altitude and heading information is needed for safe aircraft travel, Global Positioning System Attitude and Heading Reference System (GPAHRS) can be used to determine headings under dynamic conditions such as turns and speed changes. However, during a straight path of travel the accuracy of heading solutions from a low cost (low grade) GPAHRS is not reliable. Hence typically commercial flights which travel mainly straight and level need a separate heading sensor. Traditionally magnetometers have been used as a heading sensor to provide heading solutions. The use of magnetometers, however, has limitations. One limitation occurs with long haul commercial flights that often cut through the Polar Regions where the magnetic field is unsuitable for heading determination. Another limitation is that magnetometers are costly and sensitive to the installation environment. Hence alternative methods are preferred. One solution is to use Global Navigation Satellite System (GNSS) using two or more antennas to determine attitude and heading based on true carrier phase differences between the antennas. However, a method for how to best assure integrity of attitude and heading solution based on this type of system is needed.

SUMMARY

The following summary is made by way of example and not by way of limitation. It is merely provided to aid the reader in understanding some of the aspects of the subject matter described. Embodiments includes methods and systems implementing a global navigation satellite system (GNSS) with multiple antennas with fault detection.

Example 1 is a Global Navigation Satellite System (GNSS) based navigation system with signal fault detection. The system includes a plurality of spaced antennas, at least one estimator, at least one memory to at least store operating instructions and at least one controller. The at least one controller is configured to implement the operating instructions stored in the at least one memory to; determine a true carrier phase measurement associated with each satellite signal received at each antenna of the plurality of spaced antennas; for at least one satellite signal from a satellite of a plurality of satellites received by the plurality of spaced antennas, resolve integer ambiguities in true carrier phase measurement differences for a pair of antennas across a plurality of pairs of antennas to obtain a first set of resolved integer ambiguity measurements; and calculate at least one variable of a first navigation solution based on the obtained first set of resolved integer ambiguity measurements with the at least one estimator. The at least one controller is further configured to implement operating instructions in the at least one memory to apply a solution separation process to repeatedly; remove all satellite signals associated with a select satellite of the plurality of satellites; for at least one satellite signal from the remaining satellites, resolve integer ambiguities in true carrier phase measurement differences for a pair of antennas across a plurality of pairs of antennas to obtain at least one second set of resolved integer ambiguity measurements; calculate at least one variable of a second navigation solution based on the at least one second set of resolved integer ambiguity measurements with the at least one estimator; determine a difference between the calculated at least one variable of the second navigation solution to the calculated at least one variable of the first navigation solution; and detect a fault in the satellite signals from the select satellite when the determined difference exceeds a defined threshold.

In another embodiment, a system for providing Global Navigation Satellite System (GNSS) based navigation solutions including at least one of attitude and heading with signal fault detection is provided. The system includes a plurality of antennas configured to receive a plurality of the satellite signals and a system controller. The system controller is configured to determine at least a true carrier phase measurement for each received satellite signal and antenna, implement a first estimator to form a first navigation solution estimate based at least in part on determined true carrier phase measurement differences obtained from measured satellite signals across the plurality of antennas, implement a solution separation function that repeatedly includes removing all satellite signals associated with a select satellite, determining true carrier phase measurements from the remaining satellite signals, implementing a second estimator to form a second navigation solution estimate based at least in part on determined true carrier phase measurement differences obtained from measured satellite signals across the plurality of antennas from the remaining satellite signals, using estimated states of receiver clock differences when different GNSS receivers are used in tracking the satellite signals for each antenna in calculating the first and second navigation solution estimate, and detecting a fault in the satellite signals if a magnitude of a difference between the at least one of the first navigation solution variables and the at least one of the second navigation solution variables exceeds a threshold.

In yet another embodiment, a method of providing Global Navigation Satellite System (GNSS) based attitude and heading with signal fault detection is provided. The method includes receiving a plurality of satellite signals at a plurality of satellites with a plurality of antennas; determining a true carrier phase measurement for each received satellite signal; for at least one satellite signal from a satellite, resolving integer ambiguities in true carrier phase measurement differences for a pair of antennas across a plurality of pairs of antennas to obtain a first set of resolved integer ambiguity measurements; calculating at least one of a first attitude and a first heading based on the first set of resolved integer ambiguity measurements; and applying a solution separation that repeatedly includes, removing all satellite signals associated with a select satellite of the plurality of satellites, for at least one satellite signal from the remaining satellites, resolving integer ambiguities in true carrier phase measurement differences for a pair of antennas across a plurality of pairs of antennas to obtain at least one second set of resolved integer ambiguity measurements, calculating at least one of a second attitude and a second heading based on the at least one second set of resolved integer ambiguity measurements, determining a difference between the calculated at least one of the second attitude and the second heading to the calculated at least one of the first attitude and the first heading, and detecting a fault in the satellite signals when the determined difference exceeds a defined threshold.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments include methods and systems for providing global navigation satellite system (GNSS) navigation solutions with fault detection. In embodiments a solution separation is applied to provide integrity (i.e. protection levels) and fault detection for multiple antenna based attitude and heading.

Figure 1:
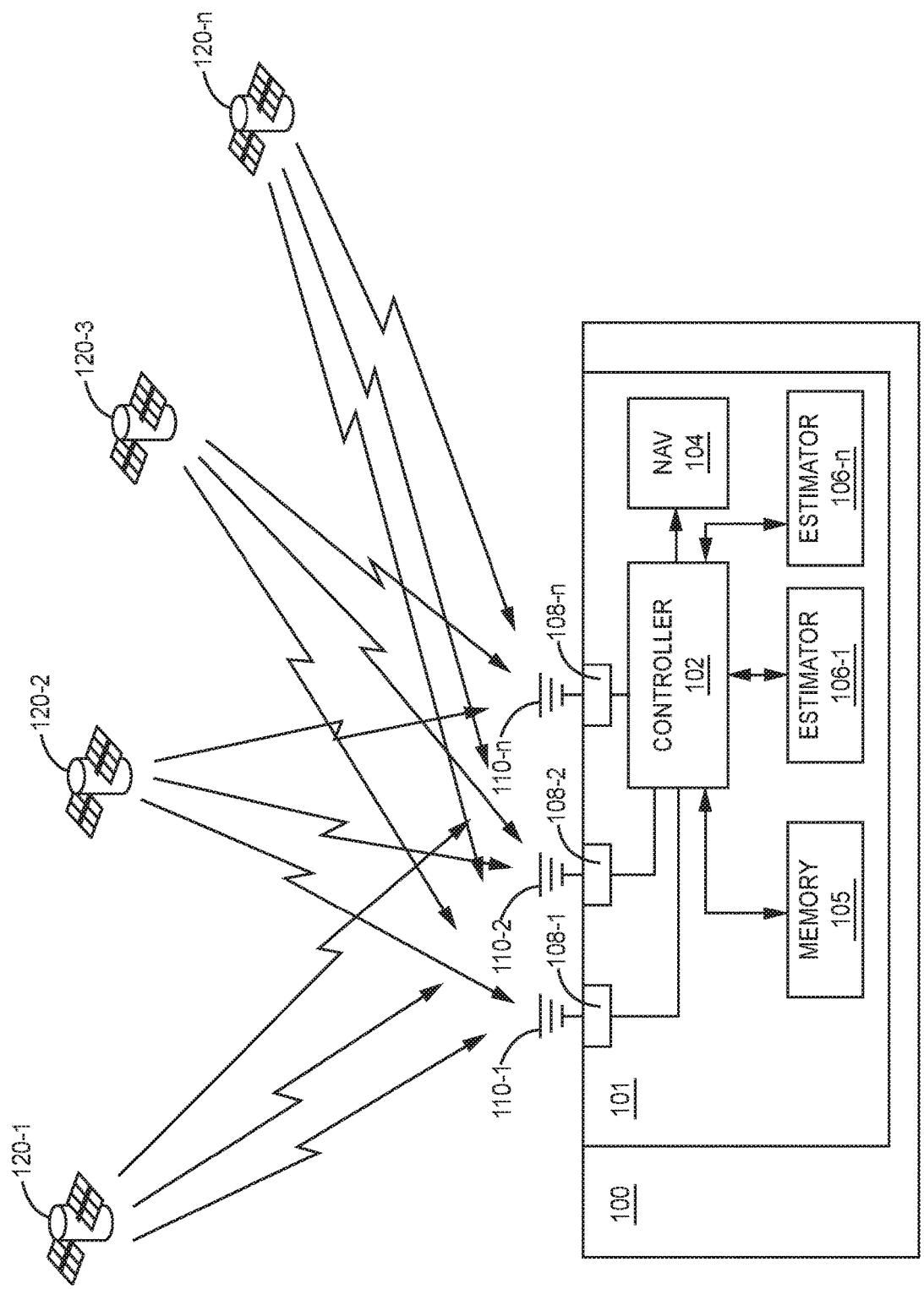
FIG. 1 is a block diagram of a vehicle implementing a GNSS navigation solution with fault detection system according to one exemplary embodiment.

Referring to FIG. 1, a vehicle 100 implementing a GNSS navigation solution with fault detection system 101 is illustrated. The vehicle 100 includes a controller 102 (or system controller) to control operations of the system. The controller 100 is in communication with a plurality of receivers 108-1 through 108-n. Each receiver 108-1 through 108-n in turn is in communication with an associated antenna 110-1 through 110-n. The antennas 110-1 through 110-n receive signals from satellites 120-1 through 120-n. The controller 102 is further in communication with a memory 105. The memory 105 is used at least in part to store received signal information from the satellites 120-1 through 120-n, operating instructions, thresholds and results. Further the system 101 includes estimators 106-1 through 106-N. The estimators are generally indicated as estimators 106. In one example embodiment, the estimators 106 includes Kalman filters as discussed below in detail. Also in the example embodiment of FIG. 1, the system 101 includes a navigation system 104. In one embodiment, the navigation system 104 displays a navigation solution, further in an embodiment, the navigation system 104 is part of a control system that controls at least in part the travel direction of the vehicle based on determined navigation solutions.

In general, the controller 102 may include any one or more of a processor, microprocessor, a digital signal processor (DSP), an application specific integrated circuit (ASIC), a field program gate array (FPGA), or equivalent discrete or integrated logic circuitry. In some example embodiments, controller 102 may include multiple components, such as any combination of one or more microprocessors, one or more controllers, one or more DSPs, one or more ASICs, one or more FPGAs, as well as other discrete or integrated logic circuitry. The functions attributed to the controller 102 herein may be embodied as software, firmware, hardware or any combination thereof. The controller 102 may be part of a system controller or a component controller. The memory 105 may include computer-readable operating instructions that, when executed by the controller 102 provides functions of the fault detection system. Such functions may include the functions of attitude and signal fault detection described below. The computer readable instructions may be encoded within the memory 105. Memory 105 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Embodiments may be used in a Global Positioning System Attitude and Heading Reference System (GPAHRS) as well as in other low grade sensor based products. In a GPAHRS, a dual antenna configuration may be used to determine heading but other applications could be based on more than two antennas providing both heading and attitude (roll, pitch) as part of an extended Kalman filter based integration. The solution separation method in an embodiment has a main extended Kalman filter and a sub filter for each excluded satellite used in the main solution. True carrier measurements are very accurate (millimeter error) but are subjected to a whole wavelength ambiguity. Before entering a baseline mode, the ambiguities must be resolved.

In embodiments, the solution separation principle of excluding one specific satellite is then applied to the ambiguity resolution performed for each sub filter (the main filter uses all satellites). The ambiguity resolution may also use smoothed pseudo range measurements (in addition to true carrier) to find the correct ambiguity. If smoothed pseudo ranges (based on pseudo ranges and delta ranges) are used in the ambiguity resolution the same rule is applied (main uses all and sub filters exclude one satellite). When the ambiguities are resolved for a satellite all true carrier phase measurements now with added identified number of full cycles (different for each filter) tied to this satellite and the relative positions of the antennas are used by the main filter and sub filters. The main filter uses all measurements with ambiguities resolved based on all satellites and each sub filter excludes all true carrier phase measurement from one of the satellites and applies true carrier measurement with ambiguities resolved without the excluded satellite. Different methods for resolving the ambiguities (i.e. the integer number of cycles between antennas) may be used in embodiments.

The Kalman filters 106, in embodiments, calculate the observation matrix based on the line of sight to the satellites and the geometry of the antennas in the body frame and corrects heading and attitude based on the received true carrier phase measurements. If separate receivers are used (such as receivers 108-1 through 108-n illustrated in the embodiment of FIG. 1), for each antenna 110-1 through 110-n the clock differences may be resolved by the Kalman filters 106 in an embodiment. The GPAHRS outputs heading and attitude with guaranteed (GNSS signal in space) integrity based on the standard solution separation rules (i.e. they are protected from any type of fault in the GNSS measurements occurring on one satellite (including any fault occurring when resolving the ambiguity)).

Figure 2:
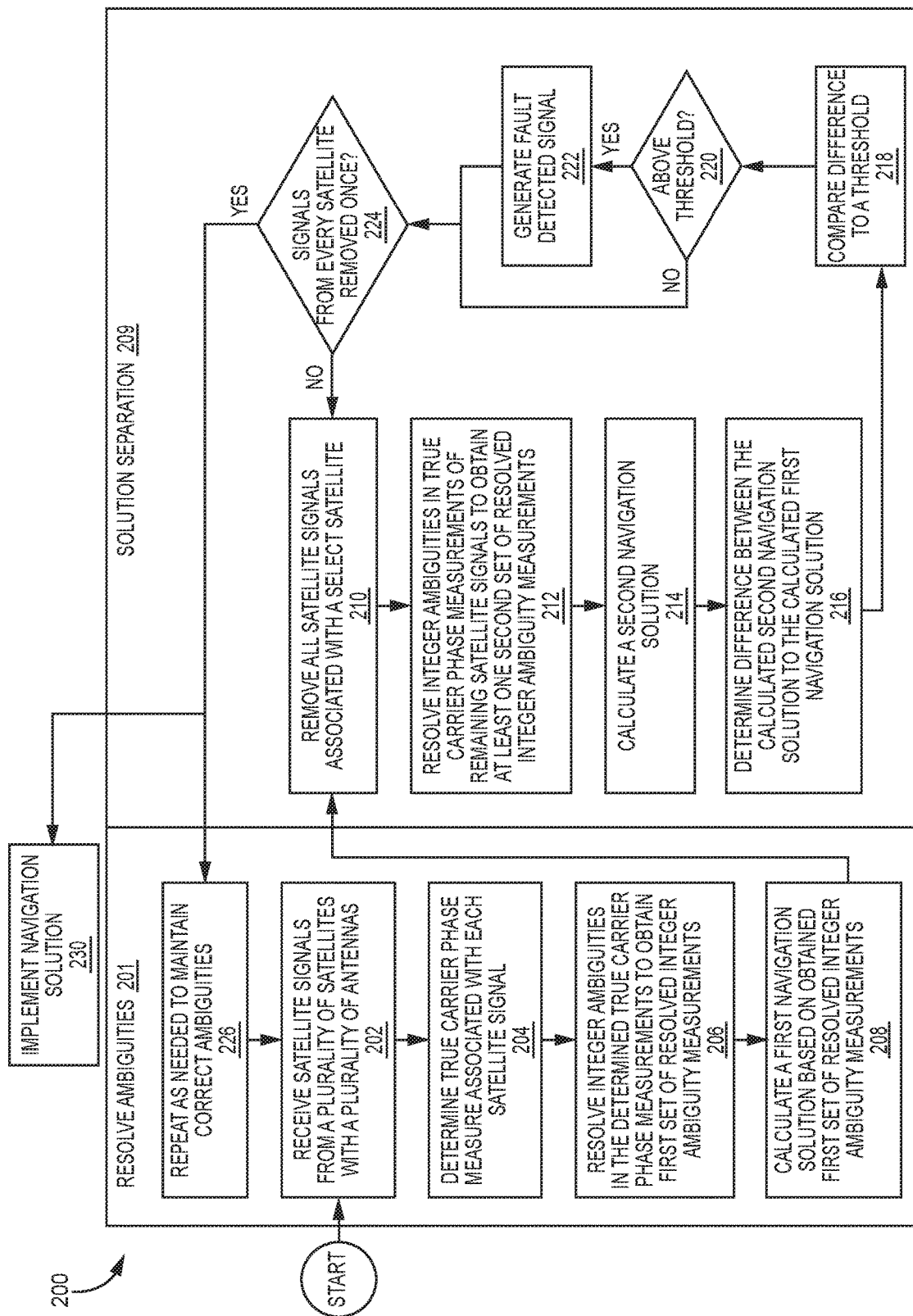
FIG. 2 is a signal fault detection flow diagram according to one exemplary embodiment.

FIG. 2 illustrates, a signal fault detection flow diagram 200 of one exemplary embodiment. The signal fault detection flow diagram 200 is provided as a series of steps. The steps in the example are provided in a sequential order. The sequence, however, may occur in a different order than what is provided in FIG. 2. Hence, embodiments are not limited to the sequential order as illustrated in FIG. 2.

The signal fault detection flow diagram 200 has two separate processes, the first is a process to resolve ambiguities 201 and the second is a solution separation 209 process. The signal fault detection flow diagram 200 example starts by receiving satellite signals from the plurality of satellites 120-1 through 120-n at the plurality of receivers 108-1 through 108-n at step (202). The controller 102 then computes true carrier phase measurement associated with each received satellite signal at step (204). In an embodiment, this is done by measuring a carrier phase at a well-defined time point in time of a received satellite signal that is in a phase locked loop across each of the receivers 108-1 through 108-n. The satellite signal includes a carrier signal with a periodic waveform between 0 degrees to 360 degrees. For example, the period may be 19 cm. Hence, every 19 cm of signal, the carrier signal repeats itself. An issue with using this type of carrier signal is that upon receiving the signal at the respective receiver 108-1 through 108-n there is ambiguity in that although it is clear where in the 0 degree to 360 degree periodic signal you are the number of additional whole wavelengths remains unknown.

In embodiments, these integer ambiguities are resolved to determine a true carrier phase carrier measurement and obtain a first set of resolved integer ambiguity measurements at step (206). Techniques for resolving the integer ambiguities typically include the use of carrier (delta range) smoothed pseudo ranges to establish a best possible relative position of each additional antenna. To determine attitude and heading (3 degrees of freedom) only 4 satellites in good geometry are needed (the $4^{th}$ one is used for the receiver clock differences). Most of the time there are more than 4 satellites and redundant information is available (another set of different satellites can provide the same information). True carrier means that the carrier measurement (0-360 degrees) is generated in a phase locked loop and at a well-defined point in time.

The differences between true carrier at different antennas reflects the difference in their clocks and the difference in their position along the line of sight to the satellite with the ambiguities due to the wavelength (19 cm for GPS) creating multiple possibilities. Given the relative positions are limited by the smoothed position differences the number of possible ambiguities is reduced. In one embodiment, resolving integer ambiguities in differences of true carrier phase measurements involves comparing an integer ambiguity in a difference between a pair of antennas with integer ambiguities associated with other satellites for the same pair of antennas.

In an embodiment, step (206) further includes steps to look at all the possible ambiguity candidates using a parity space or a chi square based consistency check. Consistency checks are goodness of fit tests relating to the nature of a distribution for a whole population of data. The parity space or a chi square based consistency checks of embodiments are used to see which of the candidate ambiguities are consistent when using all available satellites and remain consistent as the satellites move so their line of sights change over time. This process continues until only one candidate stands out as consistent while all the others suffer inconsistencies in an embodiment.

The first set of the resolved integer ambiguity measurements are used to provide a first navigation solution at step (208). The navigation solution may include attitude, heading velocities and position. Generally the true carrier phase measurement provides ranges between each antenna 110-1 through 110-n and each satellite 120-1 thorough 120-n. Since the antennas 110-1 through 110-n are not collocated, the ranges between each antenna and the satellites provide information to determine attitude and heading of the navigation solution. In particular, the use of two spaced antennas, such as antennas 110-1 and 110-2, allow for the determination of heading and the use of more than two spaced antennas allow for the determination of the attitude (pitch and roll).

The embodiment of FIG. 2, then applies the solution separation 209 process to determine signal faults. In one embodiment of the solution separation 209, all satellite signals associated with a select satellite are removed at step (210). For example, all the signals from satellite 102-1 may be initially removed in this step. Integer ambiguities of the true carrier phase measurements relating to the remaining satellite signals are resolved to obtain at least a second set of resolved integer ambiguity measurements at step (212). From the second set of resolved integer ambiguity measurements a second navigation solution is determined at step (214). As discussed above, the navigation solutions may include navigation variables such as at least one of attitude, heading, velocity and position. In an embodiment, step (212) includes steps to look at all the possible ambiguity candidates using a parity space or a chi square based consistency check similar to the steps discussed above in regards to step (206).

A difference between the calculated second navigation solution with the calculated first navigation solution is determined at step (216). The difference is then compared against a threshold at step (218). The threshold is selected to assure a required false detection rate based on the level of accuracy in the difference. If it is determined that the difference is above a threshold at step (220), a fault detection signal is generated at step (224).

It is then determined if the signals form every satellite have been removed once for determining a second navigation solution at step (224). If it is determined that the signals for a satellite has not been removed at step (224), another set of satellite signals associated with a satellite are removed at step (210) and the process continues to generate a new second navigation solution.

If it is determined that the signals have been removed for every satellite at step (224), the separation solution 209 process is complete. The process is repeated as needed at step (226) to maintain correct ambiguities. In one embodiment, the ambiguities at 210 may be rechecked at a lower rate.

In one embodiment, the controller 102 will provide final navigation solution to a navigation system 104 of the vehicle 100 after the solution separation process 209 is complete. The navigation system 104 then implements the final navigation solution at step (230). As discussed above, the navigation system 104 of the vehicle 100 may display the navigation solution, it may control at least in part the travel direction of the vehicle or be used in other systems of the vehicle or yet still may be transmitted to a remote location.

Figure 3:
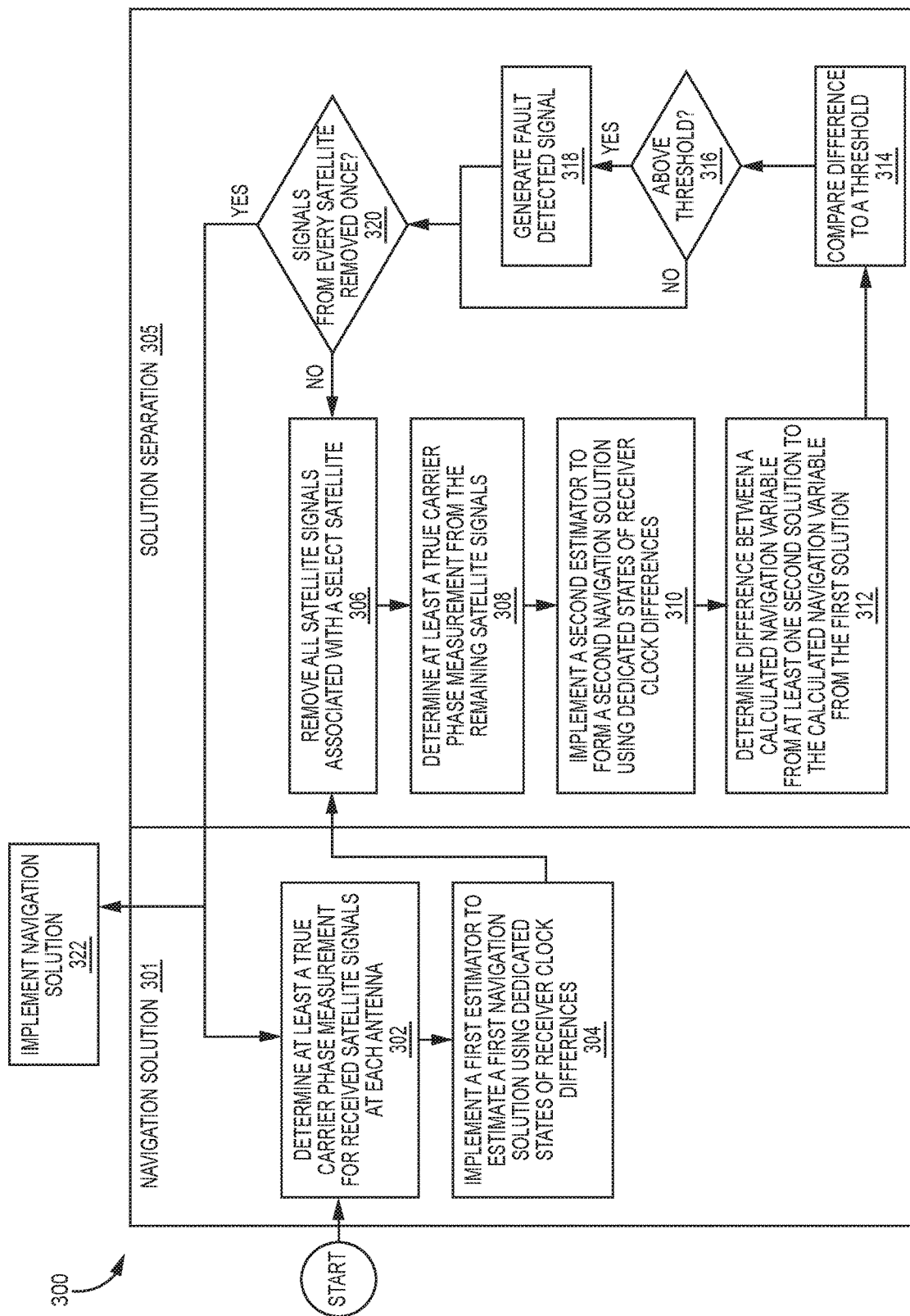
FIG. 3 illustrates a navigation solution flow diagram of an exemplary embodiment.

Referring to FIG. 3, a navigation solution flow diagram 300 of an embodiment is illustrated. The navigation flow diagram 300 is provided as a series of steps. The steps in the example are provided in a sequential order. The sequence, however, may occur in a different order than what is provided in FIG. 3. Hence, embodiments are not limited to the sequential order as illustrated in FIG. 3.

Navigation solution flow diagram 300 includes a navigation solution process 301 and a solution separation process

305. The navigation solution process 301 starts by determining at least a true carrier phase measurement for received satellite signals at each antenna 110-1 through 110-n at step (302). In one embodiment this is done as described above in the resolve ambiguities process 201 of FIG. 2. A first estimator is then implemented to estimate a first navigation solution using dedicated states of receiver clock differences at step (304). As discussed above, in one embodiment Kalman filters are used to determine the navigation solution, A Kalman filter models a set of error states. Typically, these states would reflect error in position but can also include error in velocity and attitude. The Kalman filter determines these error states in real time based on the measurements coming from the GNSS receiver. The error states are then used to correct the current position (velocity and attitude). Here error states are added that represent the difference in the clock error in each receiver tied to the additional antennas and the receiver tied to the main antenna. This makes it possible to process the true carrier phase differences directly in the Kalman filter as statistically uncorrelated measurements.

The solution separation process 305 then starts by removing satellite signals associated with a select satellite at step (306). At least a true carrier phase measurement is determined from each of the remaining satellite signals at step (308). A second estimator is implemented at step (310) to form a second navigation solution using dedicated states of receiver clock differences. A difference between a calculated navigation variable from at least one second solution to the calculated navigation variable from the first solution is determined at step (312). An example of a navigation variable includes attitude, heading, velocity, position as well as derivatives of these such as flight path angle, ground speed etc.

The difference is then compared against a threshold at step (314). The threshold is selected to assure a required false detection rate based on a level of accuracy in the difference. If it is determined that the difference is above a threshold at step (316), a fault detection signal is generated at step (318).

It is then determined if the signals from every satellite have been removed at least once in determining the second navigation solution at step (320). If it is determined that the signals for a satellite has not been removed at step (320), another set of satellite signals associated with a satellite are removed at step (306) and the process continues to generate a new second navigation solution.

If it is determined that all of the signals for every satellite have been removed at least once at step (320), the solution separation 305 process is complete. The process then continues at step 302 as the antennas receive further satellite signals.

In one embodiment, the controller 102 will provide the final navigation solution to a navigation system 104 of the vehicle 100 after the solution separation process 305 is complete. The navigation system 104 then implements the final navigation solution at step (322). As discussed above, the navigation system 104 of the vehicle 100 may display the navigation solution, it may control at least in part the travel direction of the vehicle or be used in other systems of the vehicle or yet still may be transmitted to a remote location.

Example Embodiments

Example 1 is a Global Navigation Satellite System (GNSS) based navigation system with signal fault detection. The system includes a plurality of spaced antennas, at least one estimator, at least one memory to at least store operating instructions and at least one controller. The at least one controller is configured to implement the operating instructions stored in the at least one memory to; determine a true carrier phase measurement associated with each satellite signal received at each antenna of the plurality of spaced antennas; for at least one satellite signal from a satellite of a plurality of satellites received by the plurality of spaced antennas, resolve integer ambiguities in true carrier phase measurement differences for a pair of antennas across a plurality of pairs of antennas to obtain a first set of resolved integer ambiguity measurements; and calculate at least one variable of a first navigation solution based on the obtained first set of resolved integer ambiguity measurements with the at least one estimator. The at least one controller is further configured to implement operating instructions in the at least one memory to apply a solution separation process repeatedly to; remove all satellite signals associated with a select satellite of the plurality of satellites; for at least one satellite signal from the remaining satellites, resolve integer ambiguities in true carrier phase measurement differences for a pair of antennas across a plurality of pairs of antennas to obtain at least one second set of resolved integer ambiguity measurements; calculate the at least one variable of a second navigation solution based on the at least one second set of resolved integer ambiguity measurements with the at least one estimator; determine a difference between the calculated at least one variable of the second navigation solution to the calculated at least one variable of the first navigation solution; and detect a fault in the satellite signals when the determined difference exceeds a defined threshold.

Example 2 includes the system of Example 1, further including at least one of a receiver for each antenna. The at least one controller is in communication with each receiver.

Example 3 includes the system of Example 1, including a receiver with a multiple signal front end in communication with the plurality of antennas. The at least one controller is in communication with the receiver.

Example 4 includes the system of any of the Examples 1-5, wherein the at least one controller is configured to determine the true carrier phase measurement of each satellite signal by measuring a carrier phase of a satellite signal in a phase locked loop at a defined point in time at each of the receivers.

Example 5 includes the system of any of the Examples 1-4, wherein the at least one variable is at least one of attitude, heading, velocity, position, flight path angle and ground speed.

Example 6 includes the system of any of the Examples 1-5, wherein the at least one estimator is a Kalman filter.

Example 7 includes the system of any of the Examples 1-6, further including a navigation system configured to use at least in part an output of the solution separation process.

Example 8 includes the system of any of the Examples 1-7, wherein the at least one controller is further configured to complete the separation solution when all satellites associated with each available satellite have been removed once.

Example 9 includes the system of any of the Examples 1-8, wherein the at least one controller is further configured to apply at least one of a parity space and a chi square based consistency check to verify which candidate integer ambiguities are consistent when using all available satellites and remain consistent as the satellites move so their line of sights change over time.

Example 10 includes the system of Example 9, wherein the consistency check continues until only one candidate integer ambiguity stands out as consistent while all others suffer inconsistencies.

Example 11 is a system for providing Global Navigation Satellite System (GLASS) based navigation solutions including at least one of attitude and heading with signal fault detection. The system includes a plurality of antennas configured to receive a plurality of the satellite signals and a system controller. The system controller is configured to determine at least a true carrier phase measurement for each received satellite signal and antenna, implement a first estimator to form a first navigation solution estimate based at least in part on determined true carrier phase measurement differences obtained from measured satellite signals across the plurality of antennas, implement a solution separation function that repeatedly includes removing all satellite signals associated with a select satellite, determining true carrier phase measurements from the remaining satellite signals, implementing a second estimator to form a second navigation solution estimate based at least in part on determined true carrier phase measurement differences obtained from measured satellite signals across the plurality of antennas from the remaining satellite signals, using estimated states of receiver clock differences when different GNSS receivers are used in tracking the satellite signals for each antenna in calculating the first and second navigation solution estimate, and detecting a fault in the satellite signals if a magnitude of a difference between the at least one of the first navigation solution variables and the at least one of the second navigation solution variables exceeds a threshold.

Example 12 includes the system of Examples 11, wherein at least one of the first and second estimators is a Kalman filter.

Example 13 includes the system of any of the Examples 11-12, wherein the Kalman filters are configured to calculate an observation matrix based on a line of sight to at least one satellite of the plurality of satellites and at least one antenna pair geometry of the plurality of antenna pair geometries in a body frame.

Example 14 includes the system of any of the Examples 11-13, further including a navigation system configured to implement a navigation signal output of the solution separation function.

Example 15 includes the system of any of the Examples 11-14, wherein the first and second navigation solution variables includes at least one of attitude, heading, velocity, position, flight path angle and ground speed.

Example 16 is a method of providing Global Navigation Satellite System (GNSS) based attitude and heading with signal fault detection. The method includes receiving a plurality of satellite signals from a plurality of satellites at a plurality of antennas; determining a true carrier phase measurement for each received satellite signal; for at least one satellite signal from a satellite, resolving integer ambiguities in true carrier phase measurement differences for a pair of antennas across a plurality of pairs of antennas to obtain a first set of resolved integer ambiguity measurements; calculating at least one of a first attitude and a first heading based on the first set of resolved integer ambiguity measurements; and applying a solution separation that repeatedly includes, removing all satellite signals associated with a select satellite of the plurality of satellites, for at least one satellite signal from the remaining satellites, resolving integer ambiguities in true carrier phase measurement differences for a pair of antennas across a plurality of pairs of antennas to obtain at least one second set of resolved integer ambiguity measurements, calculating at least one of a second attitude and a second heading based on the at least one second set of resolved integer ambiguity measurements, determining a difference between the calculated at least one of the second attitude and the second heading to the calculated one of the first attitude and the first heading, and detecting a fault in the satellite signals when the determined difference exceeds a defined threshold.

Example 17 includes the method of Examples 16, further providing an output of at least one of estimated attitude and estimated heading to a navigation system; and implementing the at least one of estimated attitude and estimated heading in the navigation system.

Example 18 includes the method of any of the Examples 16-17, further including estimating a first navigation solution including at least one of the first attitude and first heading using dedicated states of receiver clock differences; and estimating a second navigation solution including at least one of the second attitude and the second heading using dedicated states of receiver clock differences.

Example 19 includes the method of the Example 18, further including completing the solution separation when all satellites associated with each available satellite have been removed once.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A Global Navigation Satellite System (GNSS) based navigation system with signal fault detection, the system comprising:
 a plurality of spaced antennas;
 at least one estimator;
 at least one memory to at least store operating instructions; and
 at least one controller, the at least one controller configured to implement the operating instructions stored in the at least one memory to,
  determine a true carrier phase measurement associated with each satellite signal received at each antenna of the plurality of spaced antennas,
  for at least one satellite signal from a satellite of a plurality of satellites received by the plurality of spaced antennas, resolve integer ambiguities in true carrier phase measurement differences for a pair of antennas across a plurality of pairs of antennas to obtain a first set of resolved integer ambiguity measurements, and
  calculate at least one variable of a first navigation solution based on the obtained first set of resolved integer ambiguity measurements with the at least one estimator; and
 the at least one controller further configured to implement operating instructions in the at least one memory to apply a solution separation process to repeatedly,
  remove all satellite signals associated with a select satellite of the plurality of satellites,
  for at least one satellite signal from the remaining satellites, resolve integer ambiguities in true carrier phase measurement differences for a pair of antennas across a plurality of pairs of antennas to obtain at least one second set of resolved integer ambiguity measurements, calculate the at least one variable of a second navigation solution based on the at least one second set of resolved integer ambiguity measurements with the at least one estimator,
determine a difference between the calculated at least one variable of the second navigation solution to the calculated at least one variable of the first navigation solution, and
detect a fault in the satellite signals when the determined difference exceeds a defined threshold.

2. The system of claim 1, further comprising:
at least one of a receiver for each antenna, the at least one controller in communication with each receiver.

3. The system of claim 1, further comprising
a receiver with a multiple signal front end in communication with the plurality of antennas, the at least one controller in communication with the receiver.

4. The system of claim 1, wherein the at least one controller is configured to determine the true carrier phase measurement of each satellite signal by measuring a carrier phase of a satellite signal in a phase locked loop at a defined point in time at each of receivers.

5. The system of claim 1, wherein the at least one variable is at least one of attitude, heading, velocity, position, flight path angle and ground speed.

6. The system of claim 1, wherein the at least one estimator is a Kalman filter.

7. The system of claim 1, further comprising:
a navigation system configured to use at least in part an output of the solution separation process.

8. The system of claim 1, wherein the at least one controller is further configured to
complete the solution separation process when all satellites associated with each available satellite have been removed once.

9. The system of claim 1, wherein the at least one controller is further configured to apply at least one of a parity space and a chi square based consistency check to verify which candidate integer ambiguities are consistent when using all available satellites and remain consistent as the satellites move so their line of sights change over time.

10. The system of claim 9, wherein the consistency check continues until only one candidate integer ambiguity stands out as consistent while all others suffer inconsistencies.

11. A system for providing Global Navigation Satellite System (GNSS) based navigation solutions including attitude and heading with signal fault detection, the system comprising:
a plurality of antennas configured to receive a plurality of the satellite signals; and
a system controller configured to,
determine at least a true carrier phase measurement for each received satellite signal and antenna,
implement a first estimator to form a first navigation solution estimate based at least in part on determined true carrier phase measurement differences obtained from measured satellite signals across the plurality of antennas,
implement a solution separation function that repeatedly includes,
removing all satellite signals associated with a select satellite,
determining true carrier phase measurements from the remaining satellite signals,
implementing a second estimator to form a second navigation solution estimate based at least in part on determined true carrier phase measurement differences obtained from measured satellite signals across the plurality of antennas from the remaining satellite signals,
using estimated states of receiver clock differences when different GNSS receivers are used in tracking the satellite signals for each antenna in calculating the first and second navigation solution estimate, and
detecting a fault in the satellite signals if a magnitude of a difference between the at least one of the first navigation solution variables and the at least one of the second navigation solution variables exceeds a threshold.

12. The system of claim 11, wherein at least one of the first and second estimators is a Kalman filter.

13. The system of claim 12, wherein the Kalman filters are configured to calculate an observation matrix based on a line of sight to at least one satellite of the plurality of satellites and at least one antenna pair geometry of the plurality of antenna pair geometries in a body frame.

14. The system of claim 11, further comprising:
a navigation system configured to implement a navigation signal output of the solution separation function.

15. The system of claim 11, wherein the first and second navigation solution variables includes at least one of attitude, heading, velocity, position, flight path angle and ground speed.

16. A method of providing Global Navigation Satellite System (GNSS) based attitude and heading with signal fault detection, the method comprising:
receiving a plurality of satellite signals from a plurality of satellites at a plurality of antennas;
determining a true carrier phase measurement for each received satellite signal;
for at least one satellite signal from a satellite, resolving integer ambiguities in true carrier phase measurement differences for a pair of antennas across a plurality of pairs of antennas to obtain a first set of resolved integer ambiguity measurements;
calculating at least one of a first attitude and a first heading based on the first set of resolved integer ambiguity measurements; and
applying a solution separation that repeatedly includes,
removing all satellite signals associated with a select satellite of the plurality of satellites,
for at least one satellite signal from the remaining satellites, resolving integer ambiguities in true carrier phase measurement differences for a pair of antennas across a plurality of pairs of antennas to obtain at least one second set of resolved integer ambiguity measurements,
calculating at least one of a second attitude and a second heading based on the at least one second set of resolved integer ambiguity measurements,
determining a difference between the calculated at least one of the second attitude and the second heading to the calculated at least one of the first attitude and the first heading, and
detecting a fault in the satellite signals when the determined difference exceeds a defined threshold.

17. The method of claim 16, further comprising:
providing an output of at least one of estimated attitude and estimated heading to a navigation system; and
implementing the at least one of estimated attitude and estimated heading in the navigation system.

18. The method of claim 16, further comprising:
estimating a first navigation solution including at least one of the first attitude and first heading using dedicated states of receiver clock differences; and
estimating a second navigation solution including at least one of the second attitude and the second heading using dedicated states of receiver clock differences.

19. The method of claim 18, further comprising:
completing the solution separation when all satellites associated with each available satellite have been removed once.

* * * * *

UNITED STATES PATENT AND TRADEMARK OFFICE
CERTIFICATE OF CORRECTION

PATENT NO. : 10,996,345 B2
APPLICATION NO. : 16/005403
DATED : May 4, 2021
INVENTOR(S) : Brenner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 262 days.

Signed and Sealed this
Thirty-first Day of January, 2023

Katherine Kelly Vidal
*Director of the United States Patent and Trademark Office*